Nov. 16, 1926.
F. J. GAFFNEY
OIL CUP
Filed Nov. 26, 1924
1,607,523
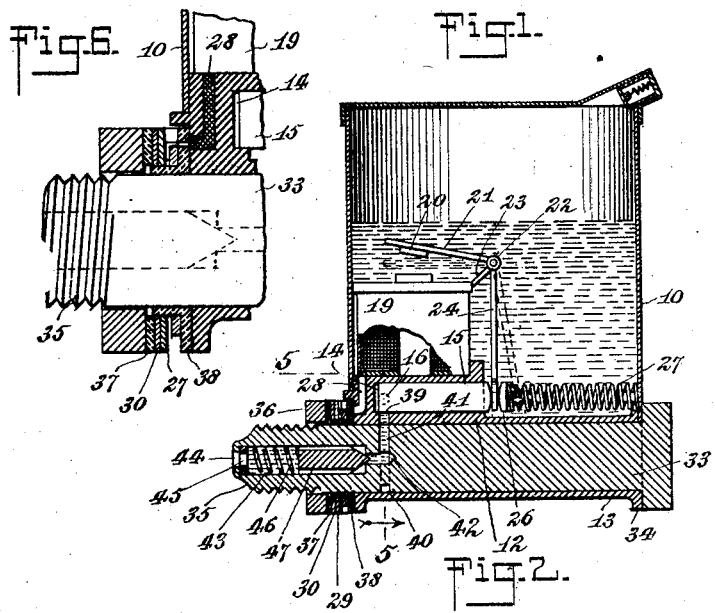
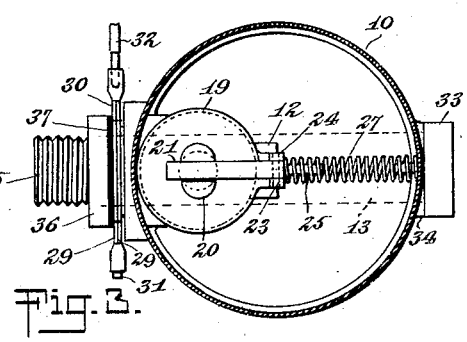
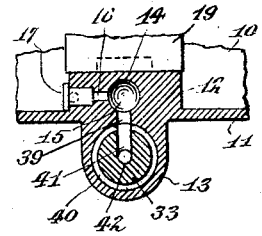
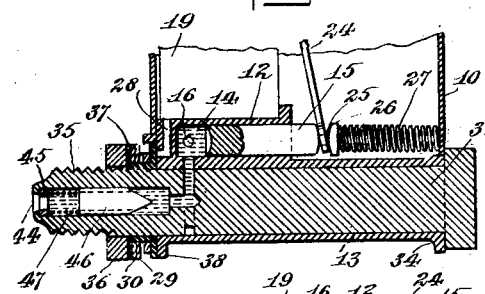
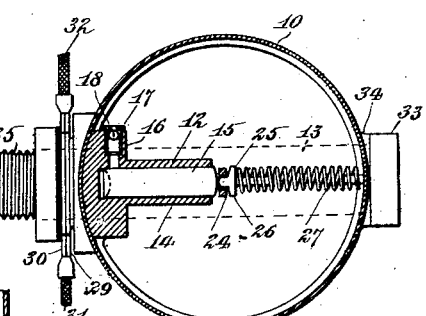
INVENTOR
*Fredrick J. Gaffney*
BY
ATTORNEYS Patented Nov. 16, 1926.

1,607,523

UNITED STATES PATENT OFFICE.

FREDRICK J. GAFFNEY, OF NEW YORK, N. Y.

OIL CUP.

Application filed November 26, 1924. Serial No. 752,412.

My invention relates to oil cups for bearings generally but particularly relates to an oil cup having special advantages as employed for various bearings of automobiles.

The general object of my invention is to provide an oil cup that may be emplaced in connection with the different bearings of an automobile and which may be positioned at any angle made necessary by the arrangement of parts adjacent the particular bearing to which the cup is applied.

A further important object of the invention is to provide for insuring a positive automatic feed over a continued period to whatever extent the requirement of a particular bearing may make necessary.

The invention also has for an important object to provide an oil cup equipped with an auxiliary oil holding chamber as well as an electromagnetic means to charge said chamber from the oil cup and mechanically operated means independent of the electromagnetic means for effecting the automatic feed.

The invention furthermore has in view to provide an oil cup having novel means to secure the oil cup to a bearing and in a manner to resist all loosening of the cup or its securing means by the vibrations incident to the operation of the automobile or other machine in which the cup is emplaced.

The manner and means whereby the above and other objects are attained as will appear will be readily understood from the specific description following.

Reference is to be had to the accompanying drawings forming a part of this specification, it being understood that the drawings are merely illustrative of one example of the invention.

Figure 1 is a vertical section of an oil cup embodying my invention;

Figure 2 is a plan view with the body of the cup in section;

Figure 3 is a vertical section of the lower portion of the oil cup and its securing bolt and feed means showing the plunger in position after having drawn oil into the auxiliary oil-holding chamber;

Figure 4 is a horizontal section in the plane of the plunger and auxiliary oil-holding chamber;

Figure 5 is a detail in transverse vertical section as indicated by the line 5—5, Figure 1;

Figure 6 is an enlarged detail view of the assemblage of parts adjacent to the forward end of the securing bolt;

Figure 7 is a vertical longitudinal section of the bottom portion of the oil cup, similar to Figure 3, but illustrating the securing bolt in reverse position from that of Figure 3.

In carrying out my invention in accordance with the illustrated example, a cup 10 is provided generally of the form employed on bearings of automobiles and in similar situations, said cup constituting a container for the supply of oil. Integral with the bottom 11 of cup 10 is cast an enlargement 12 and on the under side of the bottom integral therewith is cast an enlargement 13 extending transversely in practice the full width of said bottom 11. The enlargement 12 is bored to constitute an auxiliary oil holding chamber 14 adapted to contain a given supply of oil for automatic discharge over a continued period to the bearing to be lubricated, the bore or chamber 14 in the present example being in the form of a cylinder. A plunger 15 is adapted to have reciprocating movement in the oil chamber 14 and serves to draw in a supply of oil for a definite period from the main container chamber of cup 10 and to slowly feed the auxiliary supply thus drawn as the needs of the bearing permit the feed. Leading into the chamber 14 is an oil passage 16 provided with a check valve 17 which includes a ball check 18.

An electromagnetic responsive device is provided to actuate the plunger 15 in a direction to draw oil into the auxiliary oil holding chamber 14. In the present example, the magnet 19 is employed, the armature 20 of which is on one arm 21 of a bell-crank pivoted as at 22 on a bracket 23 of magnet 19. The other arm 24 of the bell-crank extends downwardly to the plane of the plunger 15 and is formed with a transverse hole through which passes a stem 25 rigid with the plunger 15. On stem 25 is a flange or collar 26 against which arm 24 may bear in response to the energizing of magnet 19 for moving the plunger 15 in a direction to draw oil into chamber 14. A spring 27 abuts at one end against a collar 26 and at the opposite end against the interior of the cup 10, so that said spring will tend to force the plunger 15 forwardly in chamber 14. Thus, it will be seen that the suction stroke of the plunger 15 is due to the energizing of the magnet 19. On the other hand, the magnet functions only while its circuit is closed and thereafter the magnet has no action on the plunger 15 and plays no part in the feed of the oil to the bearing, the feed being due to the reaction of the spring 27 which is compressed and stressed by the bellcrank arm 24. The numeral 28 indicates a conductor cord leading outwardly from magnet 19, the wires of the conductor cord contacting respectively with the terminals 29, 30 of the conductors 31, 32 leading to any convenient source of electricity (not shown).

I employ for securing a cup 10 in position for lubricating a bearing, a transverse bolt 33 disposed beneath the cup body 10 and passing through the enlargement 13 which has a throughbore for the purpose. The head of the bolt 33 in the form shown in Figures 1 to 6 comes to a bearing against an end flange 34 on enlargement 13. The forward end 35 of the bolt is threaded to be tapped into the automobile part or other machine part at the bearing to be lubricated.

By providing the transverse bolt 33 on the oil cup, security in the fastening of the oil cup is attained and in any necessary angular position of the oil cup (other than with the oil cup inverted). In this connection it is to be noted that the feed of the oil by the plunger 15 under the action of spring 27 insures the feeding of the oil irrespective of a change in the angle of the cup from a vertical position. The bolt 33 in addition to constituting the securing means for the cup is utilized also as part of the means to conduct the oil to the bearing and moreover it is utilized to make the electrical connections. The terminals 30, 31 are securely clamped by the screwing of the bolt 33 into place. Where required a washer 36 may be placed on the bolt between the terminals 29, 30 and the surface of the part to which the bolt is secured, the use of the washer 36 and the thickness thereof depending on the character of the parts adjacent the bearing where the oil cup 10 is to be emplaced. The washer 36 being usually of metal an insulating washer 37 may be employed between said washer and the adjacent one of the brackets 29, 30 and a second washer 38 may be employed between said terminals and the oil cup.

In the utilization of the bolt 33 for conducting the oil to the bearing, the following oil ports and passages are employed: Leading from the auxiliary oil-holding chamber 14 is an outlet orifice 39. This discharges to an annular oil groove 40 in bolt 33. Also extending from the annular groove 50 is a radial oil port 41 which communicates with and is adapted to discharge to an axial oil passage 42 leading to an oil chamber 43 in said bolt, said oil chamber having a discharge outlet 44 to deliver the oil to the bearing. At the inner side of the outlet 44 in oil chamber 43 a washer 45 may be provided having an outlet orifice leading to the oil discharge or outlet 44. A needle valve 47 in oil chamber 43 controls the passage of oil to said chamber from the axial oil passage 42, said valve being under the influence of a compression spring 46.

With the above described construction when the (one wire circuit) through the conductors 31, 32 is closed by any suitable means (not shown) the electromagnetic device 19 will be energized and draw down the arm 21 thereby causing the arm 24 to actuate the plunger 15 in a direction to draw oil in the auxiliary oil supply chamber 14 and at the same time compressing spring 27. Said movement of the plunger will draw the oil through the passage 16 into chamber 14. Upon the breaking of the circuit and the deenergizing of the electromagnetic device 19, the spring 27 will cause plunger 15 to place oil in chamber 14 under pressure independently of the electromagnetic device and as fast as the oil in the bearing is used the oil will flow from passage 39, annular groove 40, auxiliary passage 42, chamber 43 to and through the discharge 44 to the bearing. It is to be understood that the spring 27 is superior to the spring 47 so that the valve 46 will open under the pressure of the oil in the chamber 14.

In the form shown in Figure 7 the form and arrangement of the parts are as previously described except that the bolt 133 is reversed, the threaded end 35 extending through the flanged end 34 of cup 10 and the head of the bolt being adjacent to the terminals 29, 30. Washer 36 is also adjacent the said threaded end 35 of the bolt, that is to say, adjacent the flange 34 instead of at the diametrically opposite side of the cup. In the arrangement of Figure 7 the bolt head serves to clamp the terminals 29, 30. In providing a bolt in reverse position the auxiliary passage 142 corresponding with the passage 42 is elongated to extend from the radial oil passage 41 to the end of the bolt.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. An oil cup including a main container adapted to receive oil, an auxiliary oil-holding chamber having an inlet for oil from said main container, a plunger in said auxiliary chamber, electromagnetically controlled means adapted to move said plunger in a direction away from said inlet to draw oil from said main container into said chamber, an outlet for the discharge of oil and leading from said chamber, and means to operate said plunger in a direction to forcibly discharge oil from said chamber to said outlet.

2. An oil cup including a main container adapted to receive oil, an auxiliary oil-holding chamber having an inlet for oil from said main container, a plunger in said auxiliary chamber, electromagnetically controlled means adapted to move said plunger in a direction away from said inlet to draw oil from said main container into said container, an outlet for the discharge of oil and leading from said chamber, and means to operate said plunger in a direction to forcibly discharge oil from said chamber to said outlet; together with a check valve in said inlet and arranged to open inwardly for the entrance of oil to said chamber as said plunger moves away from said inlet, and an outwardly opening check valve in said outlet adapted to close said outlet when oil is flowing into said chamber through said inlet.

3. An oil cup including a main container, an auxiliary oil-holding chamber disposed transversely in the said main container at the bottom thereof, an inlet leading to said chamber from said main reservoir near an end thereof, a plunger in said auxiliary chamber, electromagnetically controlled means for moving said plunger in a direction away from said inlet to positively draw oil into said chamber, means to force said plunger in the reverse direction from the movement by said electromagnetic means and adapted to function when said electromagnetic means is out of action, and an outlet for the discharge of oil from said auxiliary chamber upon said reverse movement of said plunger.

4. An oil cup including a main container, an auxiliary oil-holding chamber, a plunger operating in said chamber, electromagnetically controlled means to actuate said plunger in a direction to positively draw oil into said chamber from said container, and a spring tending to operate said plunger in a direction opposite to the movement of the plunger in drawing in oil to force oil from said chamber, said plunger in its said opposite movement being free of said plunger-actuating means.

5. An oil cup including a main container, an auxiliary oil-holding chamber, a plunger operating in said chamber, electromagnetically controlled means to actuate said plunger in a direction to positively draw oil into said chamber from said container, and a spring tending to operate said plunger in a direction opposite to the movement of said plunger in drawing in oil to force oil from said chamber, said plunger in its said opposite movement being free of said plunger-actuating means; together with an element to place said spring under pressure, said element subject to the operation of said plunger-actuated means.

6. An oil cup including an oil container, and a transverse bolt on said container adapted to be tapped into a part at a bearing to be lubricated and adapted to exert pressure on said oil cup for securely holding the oil cup in position against turning of the oil cup about the axis of the bolt.

7. An oil cup including an oil container, and a transverse bolt on said container adapted to be tapped into a part at a bearing to be lubricated and adapted to exert pressure on said oil cup for securely holding the oil cup in position against turning of the oil cup about the axis of the bolt; together with means to cause oil to pass from the container through said bolt to the bearing.

8. An oil cup including a container, an oil discharge from said oil cup, means to establish communication between said container and said discharge, a transverse bolt on said cup adapted to secure the same to a bearing and adapted to exert pressure on said oil cup, said bolt having passages forming part of the means to establish communication between the container and the oil discharge.

9. An oil cup including a container, an auxiliary chamber in said container, a plunger in said auxiliary chamber, an electromagnetic responsive device adapted to move said plunger in a direction to draw oil into said auxiliary chamber, means to actuate said plunger in a direction to force oil from said auxiliary chamber, a securing bolt disposed transversely on said container and adapted to secure the same in position against turning about the axis of the bolt, and means to coact with said bolt for clamping a conductor terminal; together with means to establish connection between the electromagnetic responsive device and the clamped terminals.

10. An oil cup having a discharge, means to feed oil from the oil cup to said discharge, said means including an electromagnetic responsive device, and a transverse bolt to secure said cup in position at a bearing, said bolt adapted to serve for causing the conductor terminals to be clamped in position with the securing of the oil cup.

11. The combination with an oil cup, of a transverse bolt thereon constituting means to secure the cup in position, said bolt adapted to be tapped into a part at a bearing to be lubricated and adapted to press the oil cup toward the bearing, and means adapted to be frictionally engaged with said part at the bearing when the bolt is tightened against the oil cup to thereby hold the bolt and hold the cup at any given angle and prevent loosening of said bolt; together with means to direct oil from said oil cup through said bolt for lubricating in any predetermined angular position of the cup.

12. An oil cup including a container, an auxiliary chamber in said container, a plunger in said auxiliary chamber, electromagnetic means adapted to move said plunger in a direction to draw oil into said auxiliary chamber, means to actuate said plunger in a direction to force oil from said auxiliary chamber, and a securing bolt disposed transversely on said container and adapted to secure the same in position against turning about the axis of the bolt; together with means to direct oil from said auxiliary chamber through said securing bolt for lubricating.

FREDRICK J. GAFFNEY.